(12) United States Patent
Xin et al.

(10) Patent No.: US 11,505,973 B2
(45) Date of Patent: Nov. 22, 2022

(54) HANDLE SET ENGAGEMENT CARTRIDGE

(71) Applicant: Spectrum Brands, Inc., Middleton, WI (US)

(72) Inventors: Eric Xin, Xiamen (CN); James Lin, Laguna Niguel, CA (US)

(73) Assignee: Spectrum Brands, Inc., Middleton, WI (US)

( * ) Notice: Subject to any disclaimer, the term of this patent is extended or adjusted under 35 U.S.C. 154(b) by 398 days.

(21) Appl. No.: 16/600,133

(22) Filed: Oct. 11, 2019

(65) Prior Publication Data

US 2020/0115937 A1 Apr. 16, 2020

Related U.S. Application Data

(60) Provisional application No. 62/745,021, filed on Oct. 12, 2018.

(51) Int. Cl.
*E05C 1/00* (2006.01)
*F16H 19/04* (2006.01)

(52) U.S. Cl.
CPC ............ *E05C 1/006* (2013.01); *F16H 19/04* (2013.01); *E05Y 2201/47* (2013.01); *E05Y 2201/716* (2013.01); *E05Y 2201/722* (2013.01); *E05Y 2900/132* (2013.01)

(58) Field of Classification Search
CPC ... Y10T 292/0993; E05C 1/006; F16H 19/04; E05Y 2201/47; E05Y 2201/716; E05Y 2201/722; E05Y 2900/132; E05B 1/003; E05B 15/0013; E05B 3/065
USPC ..... 292/347, 22, 39, 172, 142, 279, DIG. 61
See application file for complete search history.

(56) References Cited

U.S. PATENT DOCUMENTS

| | | | | |
|---|---|---|---|---|
| 321,380 | A * | 6/1885 | Murphy | E05B 85/22 292/172 |
| 419,903 | A * | 1/1890 | Wilkins | E05C 9/041 292/39 |
| 1,195,594 | A * | 8/1916 | Kohut | E05B 63/20 292/39 |
| 1,636,069 | A * | 7/1927 | Perry | D06F 37/10 292/172 |

(Continued)

FOREIGN PATENT DOCUMENTS

| | | | | | |
|---|---|---|---|---|---|
| GB | 2001409 | A * | 1/1979 | ............ | F16H 19/04 |
| KR | 20130025429 | A * | 3/2013 | ............ | F16K 31/54 |
| WO | WO-2017195557 | A1 * | 11/2017 | ............ | E05B 83/30 |

*Primary Examiner* — Kristina R Fulton
*Assistant Examiner* — Steven A Tullia
(74) *Attorney, Agent, or Firm* — Merchant & Gould P.C.

(57) ABSTRACT

A spring assembly for a handle set assembly includes a housing and a gear rotatably positioned within the housing. The gear has a default position and at least one actuated rotated position. The spring assembly includes at least one rack positioned within the housing. The at least one rack is movable in a rack displacement direction that is normal to the axis of rotation of the gear in response to rotation of the gear between a neutral position and a displaced position. The spring assembly includes a slider positioned at a first end of the at least one rack, the slider being slidable along the rack displacement direction. The spring assembly includes at least one spring captured between the housing and slider. The at least one spring is positioned to apply a spring force to the at least one rack toward the neutral position when the at least one rack is in the displaced position.

9 Claims, 7 Drawing Sheets

(56) References Cited

U.S. PATENT DOCUMENTS

| | | | | |
|---|---|---|---|---|
| 2,253,257 A * | 8/1941 | Wellman | E05C 1/16 | 292/172 |
| 4,058,333 A * | 11/1977 | Roe | E05B 63/06 | 292/172 |
| 4,925,222 A * | 5/1990 | Loock | E05B 3/065 | 292/336.3 |
| 4,934,800 A * | 6/1990 | Choi | E05B 53/00 | 292/172 |
| 5,205,596 A * | 4/1993 | Ralph | E05B 3/065 | 292/224 |
| 5,482,334 A * | 1/1996 | Hotzl | E05B 53/00 | 292/142 |
| 5,658,026 A * | 8/1997 | Nigro, Jr | E05B 13/002 | 292/336.3 |
| 5,715,631 A * | 2/1998 | Kailian | E05B 65/0876 | 292/172 |
| 6,217,087 B1 * | 4/2001 | Fuller | E05B 55/00 | 292/33 |
| 8,459,702 B2 * | 6/2013 | Bourgain | E05C 9/041 | 292/32 |
| 8,882,162 B2 * | 11/2014 | Uyeda | E05B 59/00 | 292/336.3 |
| 9,163,437 B1 * | 10/2015 | Lawrence | E05B 65/1033 | |
| 2004/0239121 A1 * | 12/2004 | Morris | E05B 13/004 | 292/39 |

* cited by examiner

HANDLE SET ENGAGEMENT CARTRIDGE

CROSS-REFERENCE TO RELATED APPLICATION

This application claims the benefit of U.S. Provisional Application No. 62/745,021, filed Oct. 12, 2018, which application is hereby incorporated by reference in its entirety.

BACKGROUND

Door locking mechanisms are used to secure doors to door frames or complementary doors (in the case of double door systems). Such door locking mechanisms typically will include a handle or knob that can be rotated to laterally displace a latch, thereby selectively causing the latch to remain inserted within or retract from a strike plate mounted to the complementary door or doorframe.

Existing door latches utilize a spring-biased arrangement in which a handle of the door latch is maintained in a neutral position by a spring assembly, and the latch is spring biased outward to engage with a bolt receiving assembly in a door frame or complementary door. Such arrangements may include a coiled spring that is positioned axially aligned with the axis of rotation of the door actuator (e.g., a handle or lever) and having a default tension force; when a door lever is rotated in either direction, the coiled spring is urged to either uncoil or coil more tightly, and upon release, the coiled spring returns to its default position.

Such coiled spring arrangements, while returning the handle to the default position, do not provide a consistent amount of torque resistance to the user. Because of this, the user's experience with the handle can be altered. This can be particularly problematic for users that require a low torque resistance, such as the elderly or those with a disability. Therefore, improvements are needed.

SUMMARY

In accordance with the following disclosure, the above and other issues are addressed by the following description.

In a first aspect, a door actuator assembly includes a housing adapted to be mounted to a door, the housing including a face plate. The door actuator assembly includes an actuator supported by the housing and operably connected to a bolt that is movable between an extended position and a retracted position along a first direction, the actuator being rotatably movable around an axis normal to the first direction to move the bolt between the extended position and the retracted position. The door actuator assembly includes a spring assembly positioned behind the face plate. The spring assembly includes a gear axially positioned with and rotatable with the actuator, the gear having a default position in which the bolt remains in the extended position and at least one actuated position in which the bolt is moved to the retracted position, and a rack movable in a rack displacement direction that is normal to the axis in response to rotation of the gear between a neutral position and a displaced position. The spring assembly further includes at least one spring positioned to apply a spring force to the rack toward the neutral position when the rack is in the displaced position.

In another aspect, a spring assembly for a handle set assembly includes a housing and a gear rotatably positioned within the housing. The gear has a default position and at least one actuated rotated position. The spring assembly includes at least one rack positioned within the housing. The at least one rack is movable in a rack displacement direction that is normal to the axis of rotation of the gear in response to rotation of the gear between a neutral position and a displaced position. The spring assembly includes a slider positioned at a first end of the rack, the slider being slidable along the rack displacement direction. The spring assembly includes at least one spring captured between the housing and slider. The at least one spring is positioned to apply a spring force to the rack toward the neutral position when the rack is in the displaced position.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
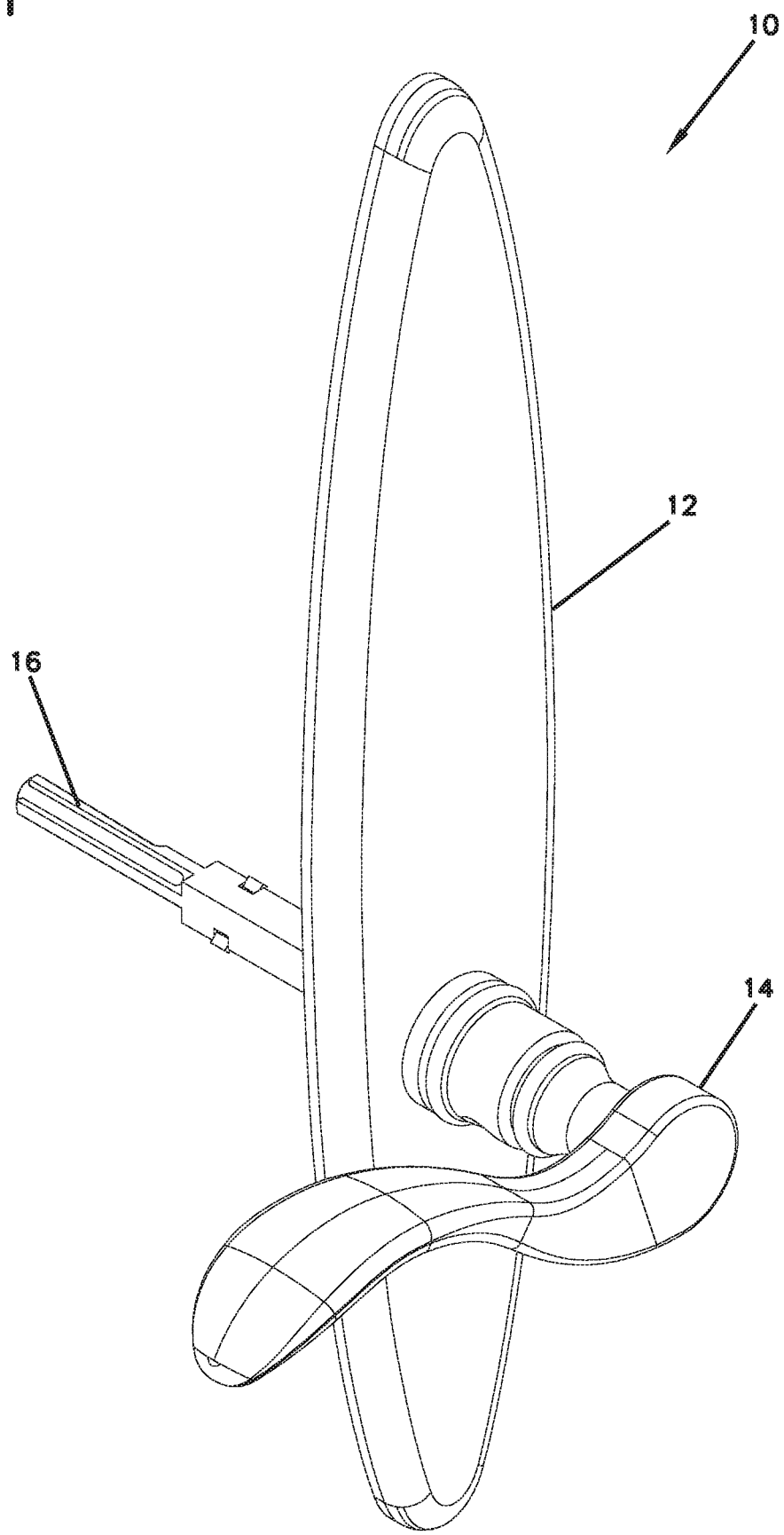
FIG. 1 is a front perspective view of a door handle incorporating a cartridge having a spring assembly according to an example embodiment.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As briefly described above, embodiments of the present invention are directed to a compression spring mechanism usable in a door latch. The compression spring mechanism is particularly useful in the context of a latch for a multi-point door. The amount of force that is required to rotate the handle can be consistently controlled, thereby providing a more reliable experience to the user while also allowing for the torque amount to be carefully controlled. Further, the system resets the handle to the default position regardless of whether or not the handle is rotated upward (relevant to multipoint doors) or downward. In addition, the system disclosed herein allows the handle to be returned automatically to a default position regardless of it is a rotated clockwise or counter clockwise.

Figure 2:
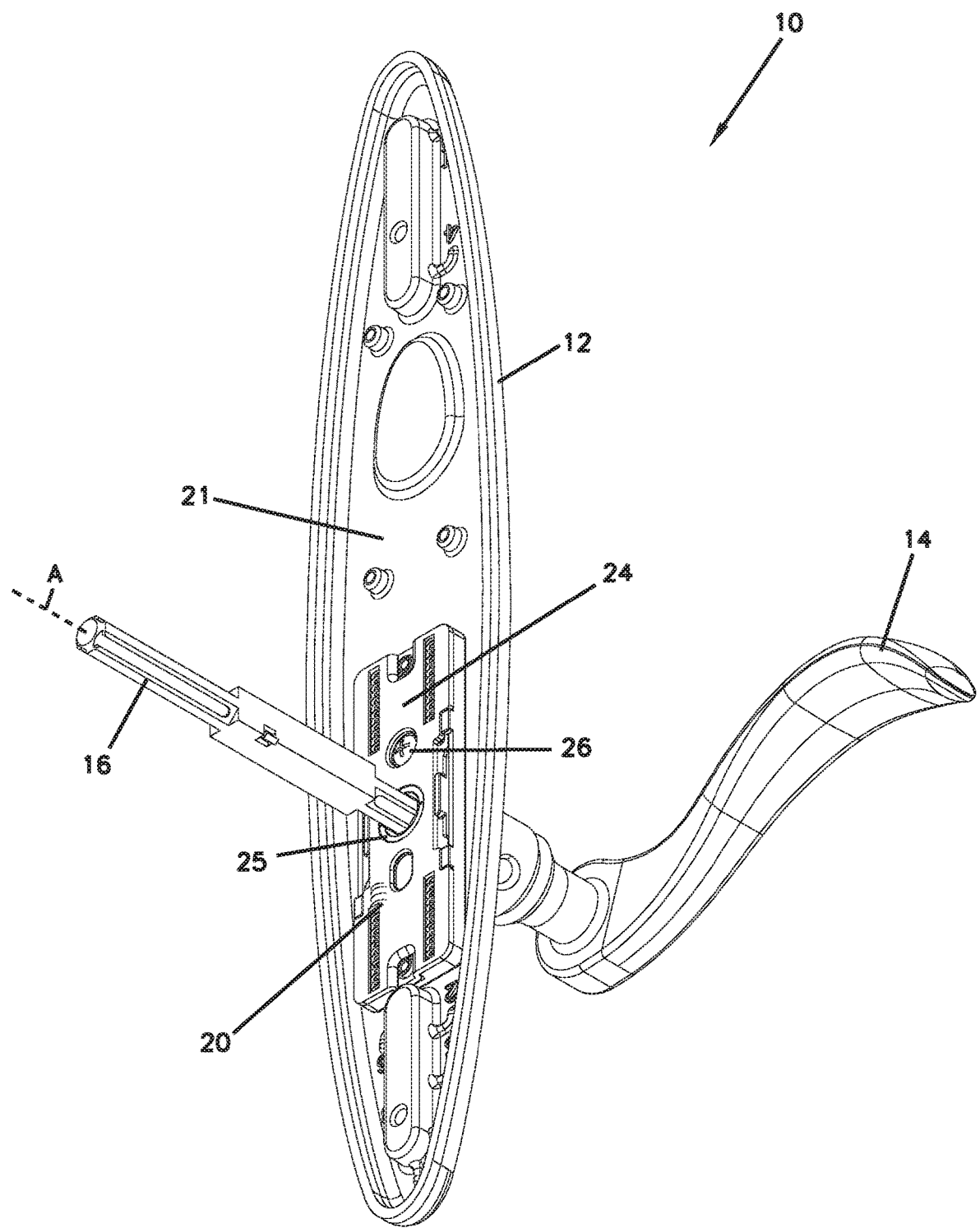
FIG. 2 is a rear perspective view of the door handle incorporating a cartridge having the spring assembly seen in FIG. 1.
Figure 3:
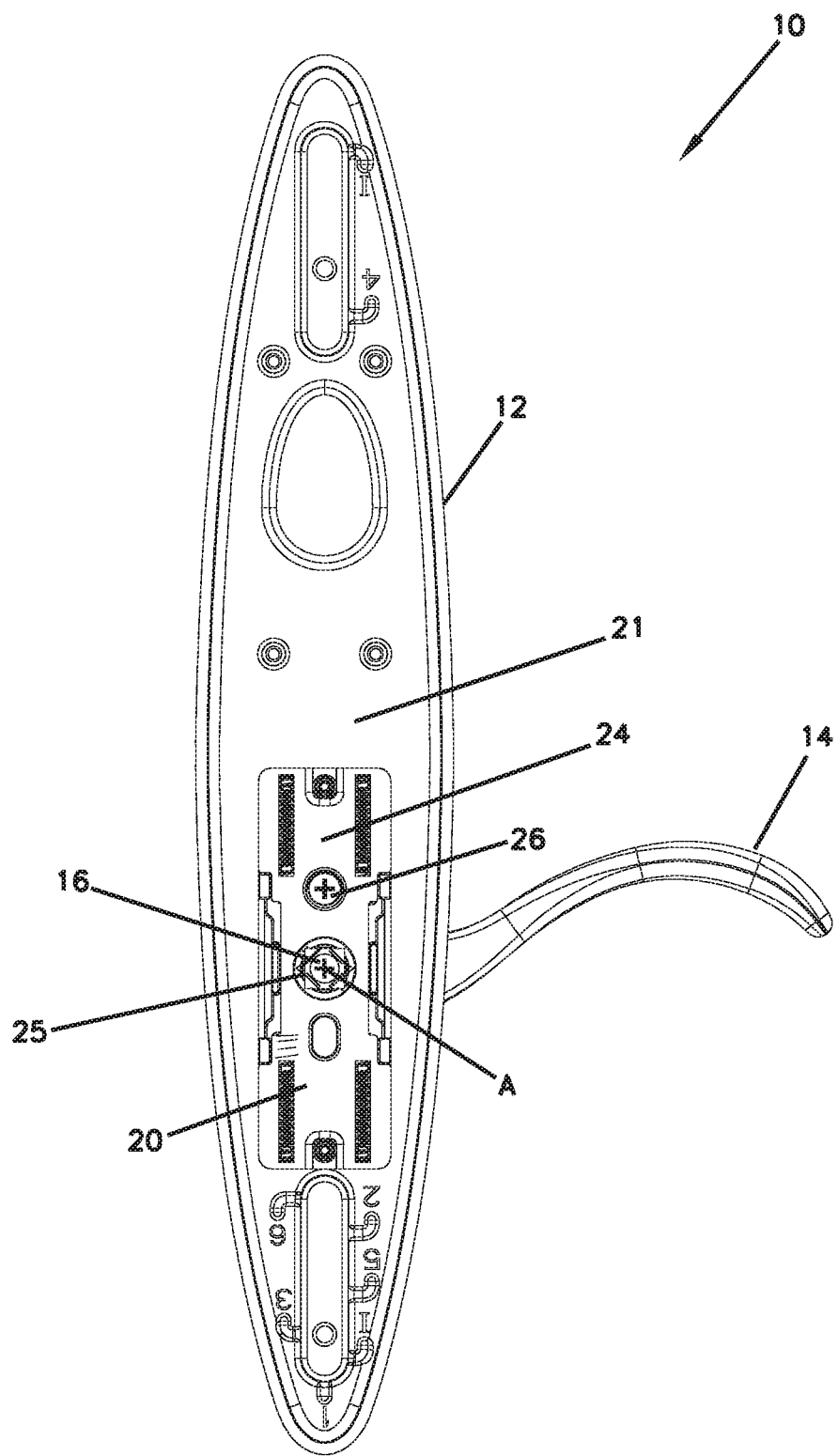
FIG. 3 is a rear plan view of the door handle incorporating a cartridge having the spring assembly seen in FIG. 1.

FIGS. 1 and 2 show front and rear perspective views of a handle set assembly 10 that is configured to be installed on a door. FIG. 3 shows a rear view of the handle set assembly 10. In some examples, the handle set assembly 10 can be paired with another substantially similar handle set assembly 10 that is installed on an opposite side of a door. The handle set assembly can be configured to interface with a latching mechanism (not shown) so that the handle set assembly 10 can operate the latching mechanism between an extended position and a retracted positioned. In some examples, the handle set assembly 10 can operate a bolt of a locking assembly as well. In some examples, the handle set assembly 10 is configured to operate a locking assembly in addition to operating a latch assembly. In some examples, the handle set assembly 10 can be used with multipoint locking doors. In other examples, the handle set assembly 10 can be used with single point locking doors.

The handle set assembly 10 includes a housing 12, a handle 14, an actuator 16, and a spring assembly 20. The handle set assembly 10 is configured to be installed on a single door in a single doorway opening or on a single door in a multi-door opening (i.e., French doors). The handle set assembly 10 is further configured to be installed on an interior or exterior door.

The housing 12 of the handle set assembly 10 can installed on the inside or outside of a door. In the depicted examples, the housing 12 is a face plate. In some examples, the housing 12 can be at least partially ornate in nature. It is considered within the scope of the present disclosure that the housing 12 can have a variety of different shapes, sizes, and configurations. In some examples, the housing 12 can be secured to a door using fasteners.

The handle 14 is configured to be operated (e.g., rotated) by the user, typically by the user's hand. In some examples, the handle 14 is rotated with respect to the housing 12. In the depicted example, the handle 14 is attached to the actuator 16 so the handle 14 and actuator 16 rotate together. While the handle 14 shown is a lever, it is considered within the scope of the present disclosure that the handle 14 can have a variety of different configurations to allow a user to interact with the handle 14. In some examples, the handle 14 is a knob.

The actuator 16 is configured to interface with a latch assembly so that upon rotation of the actuator 16, the actuator 16 operates the latch assembly, which can allow a door to become unlatched from a doorjamb to freely swing open. In some examples, the actuator 16 can also interface with a locking assembly to control when a door locks with a doorjamb. In some examples, when rotated in a first direction, the actuator 16 is configured to move a latch assembly to a retracted position. In some examples, the first direction corresponds with rotating the handle downward toward the ground. In some examples, when the actuator 16 is rotated in a second direction, opposite of the first direction, the actuator 16 is also configured to move the latch assembly to the retracted position. In some examples, the second direction corresponds with rotating the handle upward. In some examples, when moved in the second direction, the actuator 16 operates the bolt of the locking assembly to move the bolt to an extended positioned (i.e. locked). In some examples, the actuator 16 is mated to a pair of handles 12, each on an opposite side of the door. When the actuator 16 is not rotated and the handle 14 is in a default position (i.e., no rotational force exerted thereon), in some examples, the latch assembly is in the extended positioned.

Figure 4:
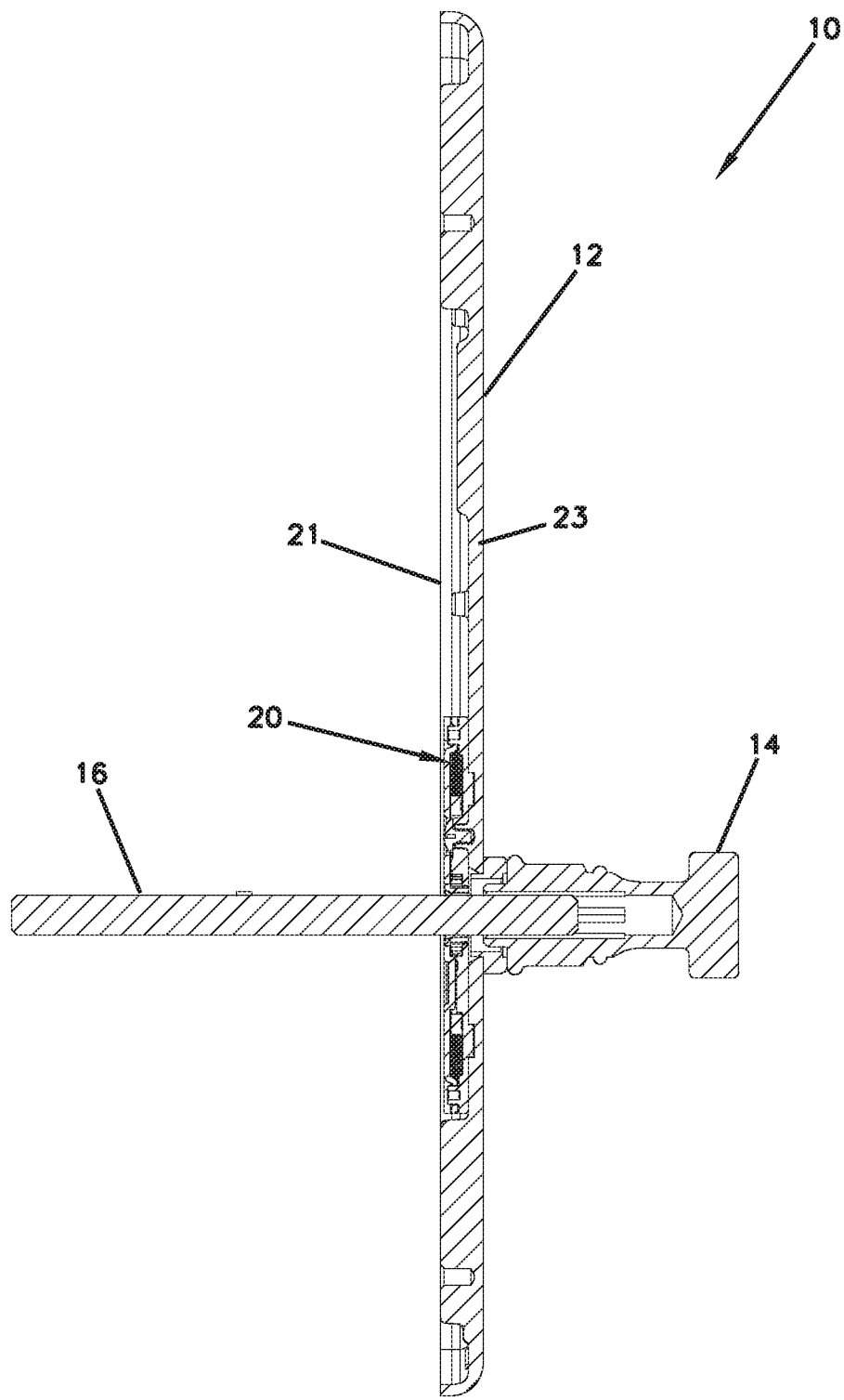
FIG. 4 is a side cross-sectional view extending through the door handle of FIG. 1 at axis A.

The spring assembly 20 is configured to urge the handle 14 to a default position when the handle 14 is rotated and released by the user. The spring assembly 20 is configured to be positioned, and in some examples, attached to, the housing 12 and be connected to the actuator 16. In some examples, the housing 12 is connected to the handle 14 in addition to, or in replacement of the actuator 16. As depicted, the spring assembly 20 is connected to an interior portion 21 of the housing 12 so that the spring assembly 20 is captured within the housing between a door face and an exterior surface 23 of the housing 12, as shown in FIG. 4.

Figure 5:
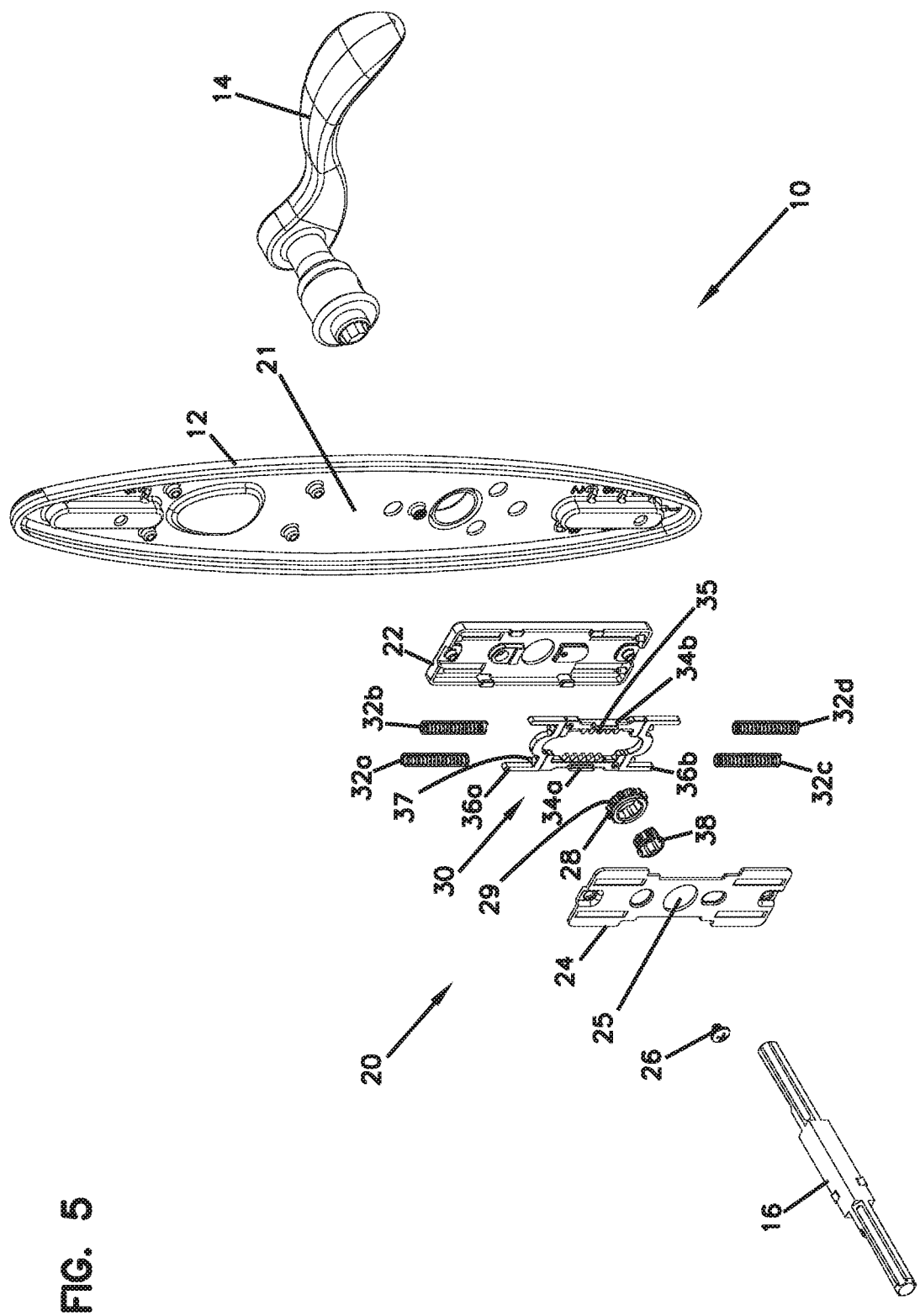
FIG. 5 is an exploded front perspective view of the door handle of FIG. 1 including a cartridge having the spring assembly of FIG. 1.

FIG. 5 shows an exploded view of the spring assembly 20. The spring assembly 20 includes a case 22, a cover 24, a cover fastener 26, a gear 28, a rack assembly 30, a plurality of springs 32a, 32b, 32c, 32d, a pair of racks 34a, 34b, and a pair of sliders 36a, 36b.

The case 22 and cover 24 together form a housing of the spring assembly 20. The case 22 and cover 24 are configured to contain the gear 28, the rack assembly 30, the plurality of springs 32a, 32b, 32c, 32d, the pair of racks 34a, 34b, and the pair of sliders 36a, 36b. The cover fastener 26 secures the cover 24 to the case 22. In the depicted examples, the case 22 is configured to be secured to the interior 21 of the housing 12 via a fastener. However, it is considered within the scope of the present disclosure, that the spring assembly 20 can be secured to the housing 12 using a variety of different types of fasteners including, but not limited to, an epoxy, a peg and aperture configuration, and rivets. The case 22 and cover 24 define an aperture 25. The aperture 25 is configured to receive the actuator 16 therethrough when the spring assembly 20 is installed in the handle set assembly 10, as shown in FIGS. 1-4.

The gear 28 is axially positioned, and rotatable, with the actuator 16. In some examples, the gear 28 receives an adapter 38 that interfaces with the actuator 16. A variety of differently shaped and sized adapters 38 are configured to be received by the gear 28 so as to allow the spring assembly 20 to be easily adaptable to a variety of different installation solutions and actuators. The gear 28 has a default position, in which the bolt remains in the extended position. In some examples, such a default position corresponds to the handle 14 being generally positioned horizontally, without a user imparting a rotational force on the handle 14. The gear 28 further has at least one actuated position in which the bolt is moved to the retracted position. Such an actuated position corresponds with the user imparting a rotational force on the handle 14. In some examples, the actuated position can correspond with the user imparting a rotational force upward, downward, or both on the handle 14. The gear 28 is configured to interface with the racks 34a, 34b.

The racks 34a, 34b make up the rack assembly 30. The racks 34a, 34b are movable in opposite directions in a rack displacement direction that is normal to the axis of rotation A of the actuator 16 in response to rotation of the gear 28 between a neutral position and a displaced position. The neutral position corresponds to the default position of the gear 28. The racks 34a, 34b are configured to interface with, and contact, the sliders 36a, 36b to cause compression of the springs 32 upon rotation of the actuator 16. In some examples, the racks 34a, 34b have teeth 35 that are configured to intermesh with teeth 29 of the gear 28. In some examples, only a single rack 34 is used. In some examples, more than two racks 34 are used.

The springs 32a, 32b, 32c, 32d are configured to bias the racks 34a, 34b, and thereby the gear 28, to the neutral and default positions, respectively. While four springs are shown, the spring assembly 20 can include a variety of numbers of springs 32. In some examples, the spring assembly 20 includes a single spring 32. In some examples, the springs are coil compression springs. In other examples, conical springs can be utilized. Further still, tension (e.g., extension) springs can be utilized by attaching the springs 32 to the racks 34a, 34a, thereby pulling the racks 34a, 34b back to the neutral position when displaced. Depending on the application, the springs 32a, 32b, 32c, 32d can be interchanged to achieve a predictable rotational force required on the handle 14 to overcome the spring forces. In some examples, the spring forces of the springs 32 can be relatively high to prevent the handle from jiggling loose. This may be applicable in a mobile solution such as on a boat or in a recreational vehicle. Alternatively, the springs 32 can have relatively low spring forces for applications such as in a retirement community.

The sliders 36a, 36b are configured to capture the springs 32a, 32b, 32c, 32d between the case 22 and sliders 36a, 36b. In depicted examples, the spring assembly 20 includes a pair of sliders 36a, 36b each being configured to interface with the racks 34a, 34b. In some examples, the sliders 36a, 36b can include posts 37 so as to position each spring with respect to the slider 36a, 36b.

Figure 6:
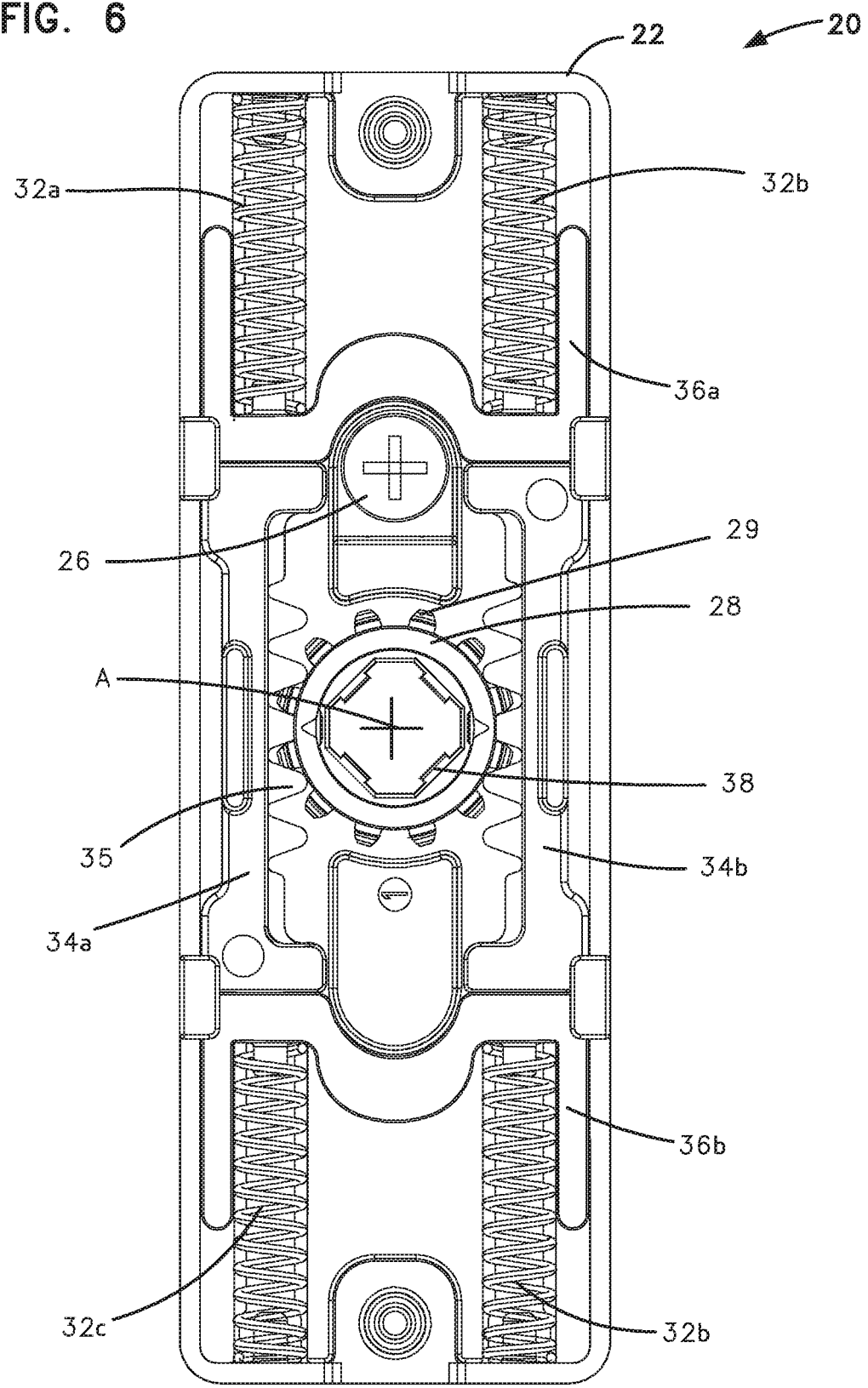
FIG. 6 is a front view of a spring assembly in a default position.

FIG. 6 shows a front view of the spring assembly 20 without the cover 24 and with the racks 34a, 34b in the neutral position and the gear 28 in the default position.

Figure 7:
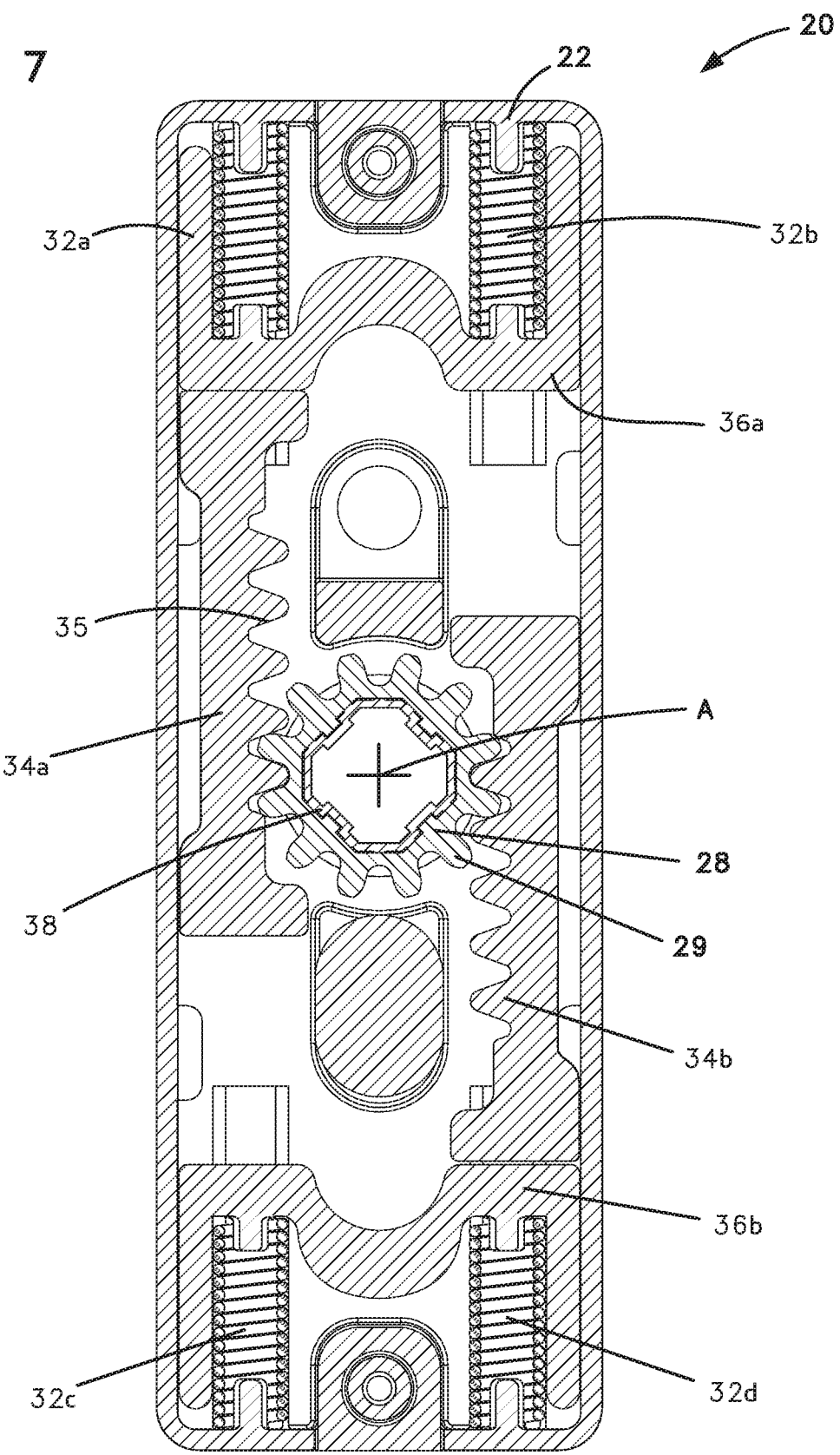
FIG. 7 is a front view of a spring assembly in an actuated position.

FIG. 7 shows a perspective front view of the spring assembly 20 without the case 22 and cover 24. As shown, the gear 28 is positioned in an actuated position (i.e., rotated from the default position), representative of a user applying a rotational force to the handle 14. As such, the gear's teeth 29 intermesh with teeth 35 of the racks 34a, 34b, and force the racks 34a, 34b in opposite directions to the displaced position. As noted above, the racks 34a, 34b are movable normal to the axis A. Upon movement of the racks 34a, 34b to the displaced position, the racks 34a, 34b contact with and force the sliders 36a, 36b upward and downward, respectively. As the sliders 36a, 36b move, springs 32a, 32b, 32c, 32d are compressed between the sliders 36a, 36b and the case 22. Such compression of the springs 32a, 32b, 32c, 32d increases the spring force on the sliders 36a, 36b. Such force biases the racks 34a, 34b toward to the neutral position once the user removes the rotational force from the handle 14.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A door actuator assembly comprising:
a housing adapted to be mounted to a door, the housing including a face plate;
an actuator supported by the housing and operably connected to a latch that is movable between an extended position and a retracted position along a first direction, the actuator being rotatably movable around an axis normal to the first direction to move the latch between the extended position and the retracted position; and
a spring assembly positioned behind the face plate, the spring assembly comprising:
  a gear axially positioned with and rotatable with the actuator, the gear having a default position in which the latch remains in the extended position and at least one actuated position in which the latch is moved to the retracted position;
  a first rack and a second rack movable in a rack displacement direction that is normal to the axis in response to rotation of the gear between a neutral position and a displaced position, wherein the rack displacement direction is also normal to the first direction, and wherein the first rack is positioned on an opposite side of the gear from the second rack, such that rotation of the gear moves the first rack and the second rack in opposite directions;
  a first slider positioned along a first end of the first rack and the second rack;
  a second slider positioned along a second end of the first rack and the second rack opposite the first end;
  at least one spring positioned to apply a spring force to the first rack and the second rack toward the neutral position when the first rack and the second rack are in the displaced position, wherein the at least one spring includes a first spring positioned to bias the first slider toward the neutral position of the first rack and a second spring positioned to bias the second slider toward the neutral position of the second rack; and
  wherein the first slider is in contact with the first end of the first rack and contacting the first spring, the first slider movable in the rack displacement direction, the second slider is in contact with the second end of the second rack and contacting the second spring, the second slider moveable in the rack displacement direction, wherein the gear, the first and second racks, the at least one spring, and the first and second sliders are all disposed on a plane that is parallel to the face plate.

2. The door actuator assembly of claim 1, wherein the gear and the first and second racks include intermeshing teeth.

3. The door actuator assembly of claim 1, wherein the spring assembly comprises a case and a cover, wherein the first and second sliders, the first and second racks, and the at least one spring are positioned within an interior of the case.

4. A spring assembly for a handle set assembly operably connected to a latch that is movable between an extended position and a retracted position along a first direction, the spring assembly comprising:
a housing;
a gear rotatably positioned within the housing and having an axis of rotation normal to the first direction, the gear having a default position and at least one actuated rotated position;
a rack positioned within the housing, the rack being movable in a rack displacement direction that is normal to the axis of rotation of the gear in response to rotation of the gear between a neutral position and a displaced position, wherein the rack displacement direction is normal to the first direction; and
a slider positioned at a first end of the rack, the slider being slidable along the rack displacement direction; and
at least one spring captured between the housing and the slider, the at least one spring positioned to apply a spring force to the rack toward the neutral position when the rack is in the displaced position, wherein the gear, the rack, the slider, and the at least one spring are all disposed on the same plane within the housing.

5. The spring assembly of claim 4, wherein the rack is a first rack and the slider is a first slider, and wherein the spring assembly comprises:
- a second rack positioned on an opposite side of the gear from the first rack, such that rotation of the gear moves the first rack and the second rack in opposite directions;
- a second slider positioned along a second end of the first rack and the second rack opposite the first end, the second slider being slidable along the rack displacement direction;
- wherein the at least one spring comprises a first spring positioned to bias the first slider toward the neutral position and a second spring positioned to bias the second slider toward the neutral position.

6. The spring assembly of claim 4, wherein the housing comprises a case and a cover, wherein the slider, the rack, and the at least one spring are positioned within an interior of the case.

7. The spring assembly of claim 4, wherein the gear and the rack include intermeshing teeth.

8. The spring assembly of claim 4, wherein the gear includes a central aperture that is positionable around an actuator of a door handle set so that the gear is rotatable with the actuator, wherein the actuator is rotatable via a handle.

9. A door actuator assembly comprising:
- a door housing adapted to be mounted to a door, the door housing including a face plate;
- an actuator supported by the door housing and operably connected to a latch that is movable between an extended position and a retracted position along a first direction, the actuator being rotatably movable around an axis normal to the first direction to move the latch between the extended position and the retracted position; and
- a spring assembly positioned behind the face plate, the spring assembly comprising:
  - a housing;
  - a gear rotatably positioned within the housing and having an axis of rotation normal to the first direction, the gear having a default position and at least one actuated rotated position;
  - a rack positioned within the housing, the rack being movable in a rack displacement direction that is normal to the axis of rotation of the gear in response to rotation of the gear between a neutral position and a displaced position, wherein the rack displacement direction is normal to the first direction; and
  - a slider positioned at a first end of the rack, the slider being slidable along the rack displacement direction; and
  - at least one spring captured between the housing and the slider, the at least one spring positioned to apply a spring force to the rack toward the neutral position when the rack is in the displaced position, wherein the gear, the rack, the slider, and the at least one spring are all disposed on the same plane within the housing.

* * * * *